May 8, 1956  G. E. ROWE  2,744,358
APPARATUS FOR FORMING PASTE MOLD GLASSWARE
Filed April 10, 1953  3 Sheets-Sheet 1

INVENTOR
GEORGE E. ROWE
BY Bates & Willard
ATTORNEYS

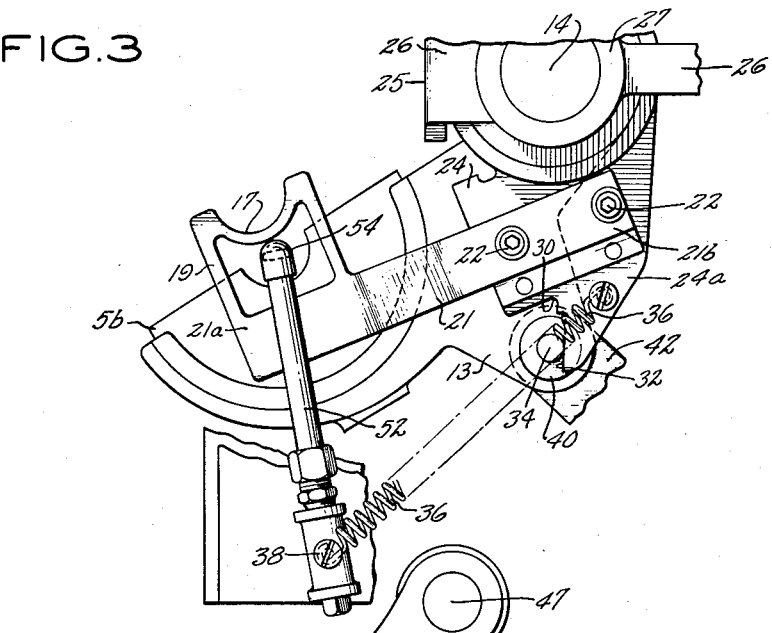

May 8, 1956  G. E. ROWE  2,744,358
APPARATUS FOR FORMING PASTE MOLD GLASSWARE
Filed April 10, 1953  3 Sheets-Sheet 3

INVENTOR
GEORGE E. ROWE
BY Bates & Willard
ATTORNEYS

United States Patent Office 2,744,358
Patented May 8, 1956

2,744,358

APPARATUS FOR FORMING PASTE MOLD GLASSWARE

George E. Rowe, Wethersfield, Conn., assignor to Emhart Manufacturing Company, Hartford, Conn., a corporation of Delaware Application April 10, 1953, Serial No. 347,981

7 Claims. (Cl. 49—18)

This invention relates to improvements in apparatus for making plaste mold glassware and more particularly to improvements in the type of apparatus of my copending application, Serial No. 213,956, filed March 5, 1951, on which Patent No. 2,645,059 issued on July 14, 1953.

In my application, Serial No. 213,956, I disclose an apparatus having means for forming a mold charge into a glass blank or parison in an inverted blank or parison mold at a relatively fixed station. The blank or parison mold includes a separable two-part inverted neck ring mounted for oscillatory movements between the blank or parison forming station and a horizontally spaced second relatively fixed station to which each blank or parison formed at the first station is transferred. A two-part upright paste mold is located at this second station and is utilized to give the final external shape desired to the blank or parison as the latter is rotated about its vertical axis and is blown to final shape in the paste mold. The neck ring serves as a transfer tongs for carrying each blank or parison from the first station to the second or paste mold station, the oscillatory movement of such neck ring acting to revert the blank or parison so that it will be in an upright position, suspended from the neck ring between the opened parts of the paste mold, when it arrives at the paste mold station.

The halves of the paste mold are closed about the suspended blank or parison at the paste mold station to take over from the neck ring support of the blank or parison, the neck ring, of course, being opened to release the blank or parison. This transfer of the blank or parison to the paste mold is effected as promptly as possible so that the neck ring can be returned promptly to the blank or parison forming station for use in the formation of the next blank or parison of a series.

As soon as the neck ring is out of the way, a blank or parison rotating tongs mechanism is lowered to an operative position directly above the paste mold and is operated to grip the projecting upper end of the blank or parison in the paste mold and assume the support thereof. The paste mold then may be opened for wetting of the internal surfaces of its parts or for development and elongation of the suspended blank or parison in free air before blowing thereof to final shape in the closed paste mold or for any other useful purpose.

The blank or parison must not be too large diametrically or in its transverse dimensions at any place along its suspended portion when it is brought to the paste mold station by the neck ring to permit prompt closing of the halves of the paste mold of the apparatus of my application, Serial No. 213,956, without being pinched by the closing paste mold halves or contacted at any place by a surface of a closing paste mold part. Such pinching or contact would impair the glassware forming operation. Any contact of the blank or parison with the surface of the paste mold cavity before such blank or parison had an opportunity to stretch and develop would cause unequal distribution of glass in the wall of the finally blow article.

An object of the present invention is to obviate the limitation on the range of ware that can be produced by use of apparatus of my aforesaid application, Serial No. 213,956, and as above described. I attain this object by providing an auxiliary tongs mechanism to which the blank or parison brought to the paste mold station by the neck ring is transferred and by which the blank or parison is supported at that station until the blank or parison rotating tongs mechanism has been operated to grip the upper end of the blank or parison so as to take over its support, all without requiring the paste mold to be closed. This will permit stretching or elongation and development of the blank or parison to a length and shape suitable for enclosure by the cavity of the paste mold when the latter is closed without contact with the surface of the paste mold cavity before final blowing.

A further object of the invention is to provide auxiliary transfer tongs of the character described which will be closed when the paste mold halves are moved from fully open positions only part way to their closed positions, and which then will permit later completion of closing movements of the paste mold halves and will open automatically when the halves of the paste mold are moved to their fully open positions.

Other objects and advantages of the invention hereinafter will be pointed out or will become apparent from the following description of a practical embodiment of the invention as shown in the accompanying drawings, in which:

Fig. 3 is a plan view of one of the halves of the paste mold and the corresponding half of the associate transfer tongs, both fully open;

Fig. 4 is a plan view of the structure shown in Fig. 2, with the fully closed positions of the halves of the paste mold indicated in full lines and their intermediate positions indicated by dash-and-dot lines.

Figure 5:
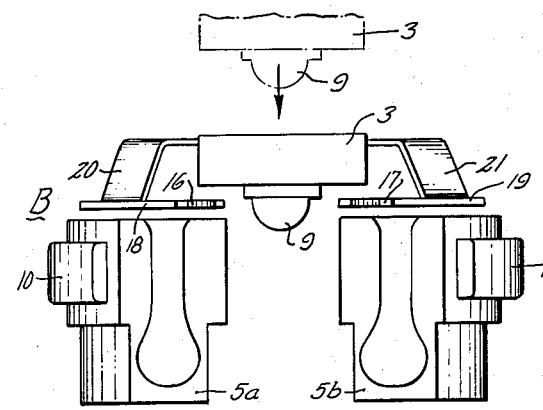
Figure 7:
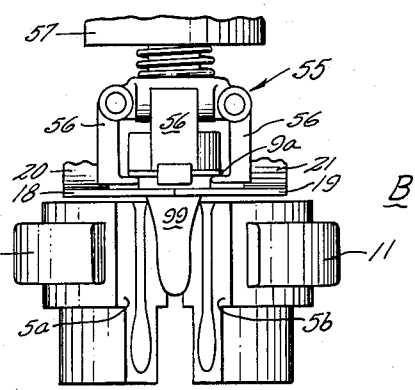
Figure 6:
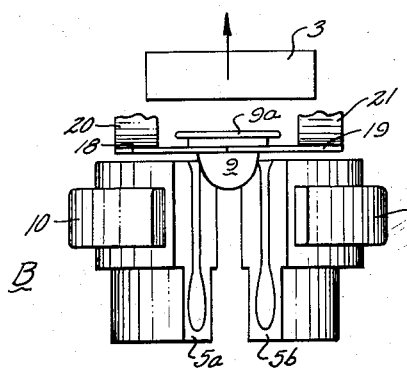
Figure 8:
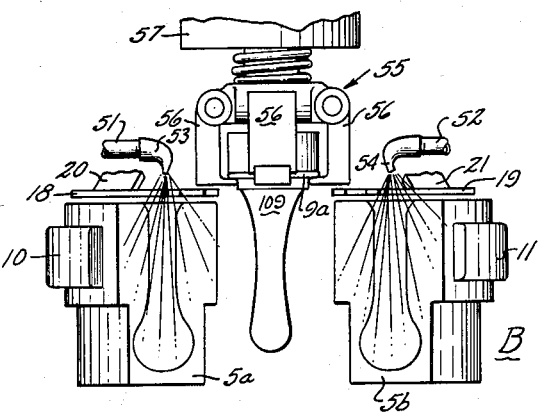
Figure 10:
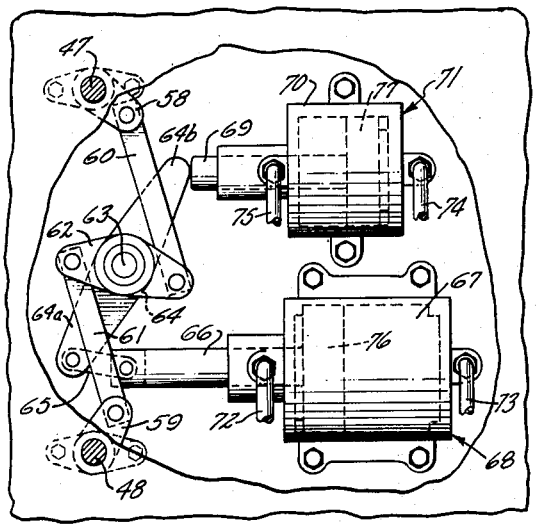
Figure 9:
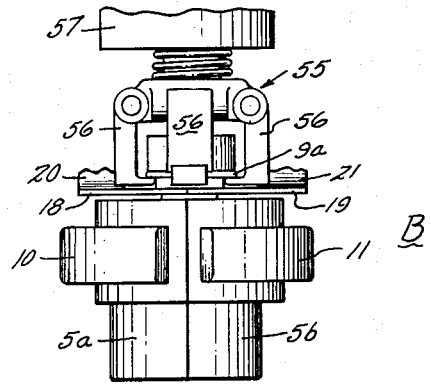

Fig. 5 is a view showing the halves of the paste mold and the halves of the auxiliary transfer tongs fully open at the paste mold station at the stage of operations when a blank or parison has been brought to that station by the neck ring, the latter being shown diagrammatically in full lines at the paste mold station and in dash-and-dot lines at a position shortly before it arrives at the paste mold station;

Fig. 6 is a view similar to Fig. 5 but showing the positions of the parts when the auxiliary tongs have been closed to take over the support of the blank or parison from the neck ring, the paste mold being only partly closed and the receding neck ring being shown slightly above the paste mold station;

Fig. 7 shows the same arrangement of paste mold and auxiliary transfer tongs parts as in Fig. 6 and further shows a combination rotating blank or parison tongs and blow head in an operative position with respect to the blank or parison at the paste mold station;

Fig. 8 shows the relation of the parts of the mechanism of Fig. 7 when the auxiliary tongs and the paste mold are fully opened and the surface of the cavity of the paste mold is being wet by liquid from spray nozzles;

Fig. 9 shows the parts of Figs. 7 and 8 with the auxiliary tongs and paste mold fully closed for final blowing of the blank or parison in the paste mold as it is being rotated by the blank or parison rotating tongs; and Fig. 10 shows operating means which may be employed to effect the opening and closing movements of the auxiliary transfer tongs and the paste mold.

Figure 1:
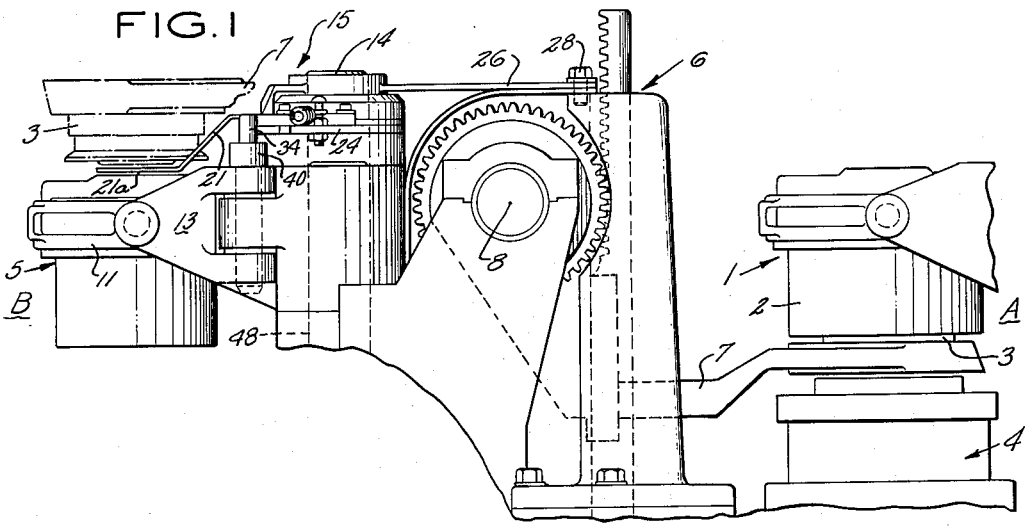
Fig. 1 is an elevation of a fragmentary portion of a glassware forming mechanism comprising paste mold equipment provided with auxiliary transfer tongs in accordance with the invention.

Referring now to Fig. 1, a blank or parison mold unit generally designated 1 is shown at a blank forming station A. This unit comprises an inverted blank or parison body mold 2 permanently located at that station and a cooperative neck ring 3 operatively positioned at the lower end of the inverted blank or parison body mold. A mechanism generally designated 4 is located beneath the neck ring and may comprise a conventional neck pin-and-thimble assembly cooperative with mold unit 1 to aid in the formation of the desired blank or parison or a pressing plunger-and-guide assembly for the same purpose and also of known structure and mode of operation. The details of the mechanism 4 therefore need not be illustrated or further described.

The neck ring 3, in addition to aiding in the formation of the desired blank or parison, is used to carry the blank or parison thus formed from the blank forming station A to a horizontally spaced also relatively fixed second station indicated at B at the left hand side of Fig. 1 at which a blow mold 5 is permanently disposed. In the example shown, blow mold 5 is a paste mold and the station B therefore may be termed a paste mold station.

The mechanism for transferring the blank or parison from the station A to the station B is designated generally at 6 in Fig. 1 and comprises an oscillatory arm structure 7 mounted to swing about the axis of a horizontal supporting shaft 8 so as to swing the neck ring from the position at the station A indicated by full lines to the position indicated by dot-and-dash lines at the station B and back again. It all will be understood that the blank or parison body mold 2 may comprise openable sections and that these are open at appropriate times to provide clearance for the required swinging movements of the neck ring. The transfer mechanism 6 may be substantially like the neck ring type blank or parison transfer mechanism that is disclosed in detail in U. S. Patent No. 1,911,119 of May 23, 1933, to H. W. Ingle, particularly in Figs. 3 and 5 thereof. The neck ring is inverted during the transfer movement thereof from station A to station B so that a blank or parison carried thereby, an example of which is indicated at 9 in Fig. 5 of the drawings of the instant application, will be disposed in a downwardly hanging position at the paste mold station B.

The paste mold 5 comprises a pair of halves or sections 5a and 5b, respectively, mounted in holders 10 and 11, respectively. These holders are carried by paste mold holder arms 12 and 13, respectively, mounted to swing about the axis of a vertical blow mold hinge post 14. See particularly Figs. 2 and 4. The arrangement is substantially as disclosed for the blow mold of U. S. Patent No. 1,911,119.

The neck ring 3 also is conventional and comprises two cooperative halves which are closed to aid in the formation of a blank or parison at the station A, are kept closed to carry the blank or parison from station A to station B, and are opened on arrival at the station B to release the blank or parison. The neck ring then will be returned to the station A for use in the formation of the succeeding blank or parison and will be closed during its return movement or on arrival at station A. It will be understood that the halves of the paste mold 5 are open as shown in Fig. 5 when the blank or parison is brought to the paste mold station B.

In the operation of the apparatus of my copending application, Serial No. 213,956, the paste mold halves are closed to take over the support of the blank or parison from the opening neck ring on arrival of the latter at the paste mold station. In an apparatus including the improvements of the invention of the present application, an auxiliary transfer tong mechanism is provided for the purpose of taking over the support of the blank or parison from the first or main transfer means without requiring closing of the halves of the paste mold.

Figure 2:
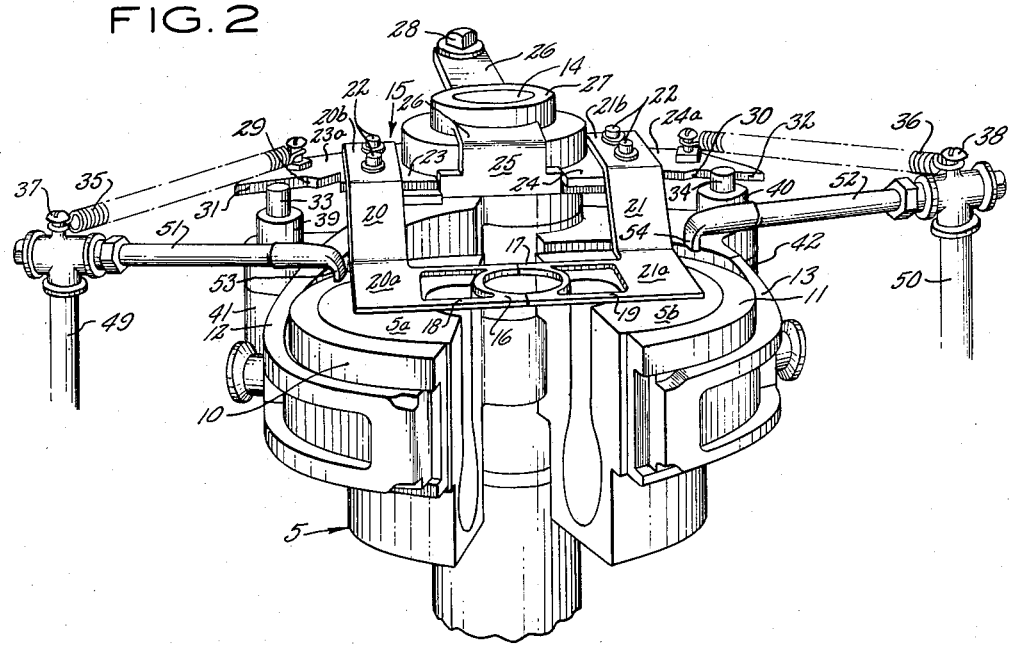
Fig. 2 is a perspective view showing paste mold and associate auxiliary transfer tongs at the paste mold station with the auxiliary tongs closed and the halves of the paste mold at intermediate positions between fully opened and closed positions.

The auxiliary transfer tongs as illustrated in the drawings and indicated generally at 15 in Fig. 2 thereof comprises a pair of cooperative, suitably shaped blank or parison supporting elements or jaws 16 and 17, respectively, formed at the adjacent ends of inturned, co-planar lateral extensions 18 and 19, respectively, of downwardly offset free end portions 20a and 21a, respectively, of tong arm sections 20 and 21, respectively. These have higher level attaching end portions 20b and 21b, firmly secured, as by fastening devices 22, to horizontally disposed pivoted arm sections 23 and 24, respectively, mounted on paste mold hinge post 14 for swinging movements about the axis of the latter and hence about the same axis as the halves of the paste mold. As shown, the sections of the tong arms are made of flat bars or pieces of light gauge sheet metal or other suitable material and the tong jaws have arcuate contact surfaces or edges of approximately 180°. The mounting of these arms as described permits the tong jaws to be closed and opened with relation to the same vertical axis as the halves of the paste mold and in a plane close above that of the upper surfaces of the paste mold halves.

The closing movements of the tong jaws are limited by a fixed position stop member 25 which is located midway between the inner side edges of the pivoted tong arm sections 23 and 24. The closed positions of the tong jaws are shown to advantage in Figs. 2 and 4 and from the latter it will be noted that the closed jaws are aligned axially with the directly underneath closed paste mold when their closing movements are halted by the contact at a and b, respectively, of inner side edges of the tong arm sections 23 and 24, respectively, with opposite side edges of the stop member 25. As shown, the stop member 25 is a downturned inverted T-shaped end portion of a bar 26 having an intermediate collar portion 27 fitting closely but turnably on the upper end portion of the hinge post 14 and extending to a stationary part of the transfer mechanism 6 and securely fastened thereto in an angularly adjusted position at its end remote from the stop 25, as by a fastening device 28 and slot 26a in the bar 26.

The tong arm sections 23 and 24 have portions 23a and 24a, respectively, projecting laterally outward beyond the outer side edges of the attached end portions of tong arm sections 20 and 21, respectively. These projecting portions 23a and 24a are notched at their edges facing in the same direction as the tong arms 20 and 21, as at 29 and 30, respectively, so as to provide suitable shaped contact edges 31 and 32, respectively, in position to strike or be struck by upstanding pins 33 and 34, respectively, on portions of paste mold holder arms 12 and 13, respectively, on certain relative swinging movements of the tong arms and the paste mold arms as presently will be explained. Tension coil spring 35 and 36, respectively, operatively connect elements 23a and 24a with fixed anchor elements 37 and 38, respectively, and yieldingly urge the tong arms constantly toward their closed positions. The stops 33 and 34 in the example shown are upward extensions of hinge pins 39 and 40, respectively, by which the arms 12 and 13, respectively, are hingedly connected with links 41 and 42, respectively. These in turn are pivotally connected at 43 and 44, respectively, with horizontal rocker arms 45 and 46, respectively, on the upper ends of vertical rock shafts 47 and 48, respectively, as shown in Fig. 4. These rock shafts are turned back and forth about their respective axes to effect opening and closing of the halves of the paste mold and of the tong jaws as hereinafter will be explained.

The fixed position anchoring elements 37 and 38 are shown as screws on the tops of liquid stand pipes 49 and 50, respectively. These deliver water or other liquid to inturned horizontal pipes 51 and 52, respectively, which terminate in nozzles having downwardly turned tips 53 and 54, respectively, positioned to spray water or other suitable liquid onto the glass contact surfaces of the halves of the paste mold when these have been opened.

The apparatus of the invention of the instant case makes use of a third blank or parison supporting mechanism to take over support of the blank or parison from the auxiliary transfer tongs 15 at a predetermined time in a cycle of operations for the formation of an article of paste mold glassware. This may be a rotary tongs mechanism substantially like that shown and described in my foresaid copending application, Serial No. 213,956, and as such is indicated generally at 55 in Figs. 7, 8 and 9. Mechanism 55 includes a plurality of cooperative openable and closable tong elements 56 for gripping between them the projecting upper end 9a of the blank or parison 9. Rotary mechanism 55 may be in combination with a blow head as disclosed in my said copending application, a fragmentary portion of the blow head being shown more or less diagrammatically and indicated at 57 in Figs. 7, 8 and 9.

A typical operation of the apparatus as described so far will now be described. A blank or parison, as the blank or parison 9, is brought by the neck ring to the paste mold station B as shown in Figs. 1 and 5. The halves of the paste mold are moved from their fully open positions as shown in Fig. 5 part way to their closed positions, as to the positions shown in Fig. 6. This will permit closing of the jaws of the auxiliary transfer tongs by the tongs springs 35 and 36 so that these tong jaws will embrace the blank or parison just below its projecting flanged upper end portion 9a so as to support the blank or parison in the proper position at the paste mold station when it has been released from the neck ring by opening of the latter. In the example shown, the blank or parison 9 is suitable to be formed into an electric bulb and is comparatively short and stubby. If the halves of the paste mold were closed at this time, the body of the blank or parison would be pinched between them or at least harmfully contacted thereby. This is obviated according to the present invention by the provision and operation of the auxiliary transfer tongs which supports the blank or parison at the paste mold station until the support thereof can be taken over by the blank or parison rotating tongs mechanism 55. This may be done as soon as the space above the closed auxiliary tongs 15 required for the rotating tongs—blow head mechanism 55—57 has been cleared by withdrawal of the neck ring. Mechanism 55 is rotated about its vertical axis after it has been brought to its active position and its gripper members or jaws 56 have been closed to grip between them the projecting upper end 9a of the blank or parison, as in Fig. 7. By this time the transferred blank or parison has elongated somewhat and its suspended body may have a shape substantially as indicated at 99 in Fig. 7.

Support of the elongating blank or parison having been taken over by the rotating tongs mechanism 55, the auxiliary transfer tongs 15 and the paste mold may be opened fully to permit wetting of the internal or molding surfaces of the paste mold halves with liquid from the spray nozzles 53 and 54 as shown in Fig. 8. This is done by opening the paste mold halves from their intermediate positions and the contact of the pins 33 and 34 on the paste mold arms with the edges 31 and 32, respectively, of the projecting portions of the pivoted auxiliary tong arm sections 23 and 24, respectively, will fully open the auxiliary tongs. The blank or parison has continued to elongate and its body may now have a shape substantially as indicated at 109 in Fig. 8.

The auxiliary transfer tongs may again be closed and the paste mold may be closed for the first time in the cycle of operations being described when the desired wetting of the internal or molding surfaces of the paste mold halves has been accomplished and the body of the suspended blank or parison at the paste mold station has elongated downwardly sufficiently to be enclosed in the paste mold without contact with the molding surfaces prior to final blowing. Movement of the paste mold halves part way to their closed positions will permit the auxiliary tongs to close. Closing of the paste mold halves can then be effected as shown in Fig. 9 and the blank or parison in the paste mold can be blown to final form by blowing air from the blow head 57 while such blank or parison is suspended from and rotated by the tongs mechanism 55. If desired, development and elongation of the suspended blank or parison before closing of the paste mold may be aided or attended by rotation of the suspended blank or parison and/or by puff blowing thereof.

After final blowing, the paste mold halves and the auxiliary tongs mechanism may be fully opened to permit take-out of the finally blown article of paste mold glassware. This may be accomplished by use of any suitable known take-out means and in any suitable known way.

To effect opening and closing movements of the paste mold halves and hence of the auxiliary transfer tongs also, the rock shafts 47 and 48 are given appropriate rotary movements about their respective vertical axes by an operating mechanism which may be substantially as shown in Fig. 10. The lower ends of the shafts 47 and 48 carry short rocker arms 58 and 59, respectively. These are connected by links 60 and 61, respectively, to the opposite ends of a lever 62 fastened to an intermediate vertical rock shaft 63. The vertical rock shaft 63 carries an additional lever indicated at 64, having a projecting end portion 64a which is operatively connected by a link 65 to a piston rod 66 projecting from a pneumatic cylinder 67 of an air motor 68. Lever 64 has an opposite end portion 64b projecting into the path of movement of the end of a piston rod 69 projecting from an air cylinder 70 of a second air motor 71. Air cylinder 70 is shorter than cylinder 67, being approximately half the length of the latter. The cylinder 67 of air motor 68 has suitable combination air pressure admission and exhaust connections 72 and 73, respectively, at its opposite ends. Air cylinder 70 has an air pressure admission and exhaust connection 74 at the end thereof opposite that from which the piston rod 69 projects and has an air venting connection 75 at its piston rod end.

Starting with the paste mold halves and the auxiliary tongs fully open as in Fig. 5 and with the parts of the operating mechanism as in Fig. 10, air under pressure may be admitted through connection 74 to cylinder 70 to drive piston 77 therein to the opposite end of cylinder 70 from that shown. This will effect movements of the paste mold halves approximately half way from their fully open positions to their closed positions and will permit the auxiliary tongs to close. The positions of these parts will be as shown in Figs. 6 and 7. The piston 76 in the long cylinder 67 will have been moved approximately half way to the opposite end of the cylinder. To fully open paste mold halves and the auxiliary tongs for the mold wetting operation shown in Fig. 8, air under pressure is supplied through connection 73 to long cylinder 67 and connection 74 of the short cylinder is at the same time opened to exhaust. After the mold wetting operation the paste mold halves and the auxiliary tongs may be fully closed as shown in Fig. 9 for the blowing of the blank or parison to final form by supplying air under pressure through connection 72 of the long cylinder while permitting exhaust through connection 73 at the opposite end of that cylinder. To fully open the paste mold and the auxiliary tongs after the final blowing operation has been completed, air under pressure will be admitted to the long cylinder 67 through connection 73 while exhaust from the opposite end of that cylinder can take place through connection 72. This will complete a cycle of movements of the paste mold halves and parts of the auxiliary tongs.

The timing and control of applications of air to and exhausts of air from the cylinders as described may be effected by any suitable known mechanism (none shown) as for example one substantially like the timing drum and valve system of the disclosure of the aforesaid Ingle Patent No. 1,911,119. Any suitable known operating mechanism for effecting the described movements of the paste mold halves may be provided and employed in lieu of that particularly described.

The operations described have been for the production of an electric light bulb and the jaws of the auxiliary transfer tongs and the molding surfaces of the halves of the paste mold are appropriate for that operation. The auxiliary tongs are adapted to supportingly embrace blanks or parisons for other articles of paste mold glassware and obviously may be changed as may be required or desirable in view of the particular configuration or size of the portion of a particular blank or parison to be embraced by the jaws of the tongs. The cavity of the paste mold will of course be suitable for the particular article of glassware to be made.

I do not wish to be limited to the details of the illustrative apparatus shown and described herein since various changes therein and modifications thereof will readily occur to those skilled in the art.

I claim:

1. In a glassware forming machine, a blow mold comprising a pair of openable and closable halves and having a molding cavity open at the top of the mold when the halves thereof are closed, a glass blank or parison transfer tongs comprising a pair of openable and closable jaws mounted to close in a plane directly above and in axial alignment with the mold when the halves of the latter are closed, yieldable means arranged constantly to urge said jaws from their open to their closed positions, operating means for the mold halves operable to move them only part way from their fully open to their fully closed positions, thereafter to move them the remainder of the way to their fully closed positions, and to return them from their fully closed to their fully open positions, rigid projecting elements fixed to the tongs jaws to move therewith, and other rigid projecting elements fixed to the mold halves to move therewith and to co-act with the first named rigid elements to permit said tongs jaws to be moved by said yieldable means from their open to their closed positions in response to movements of said mold halves from their fully open positions only part way to their fully closed positions and to open said tongs jaws against the action of said yieldable means in response to return movements of said mold halves to their fully open positions.

2. The combination defined by claim 1 wherein said tongs jaws and said mold halves are mounted to swing about a common vertical axis and stop means is provided to limit closing movements of the tongs jaws about that axis.

3. In a glassware forming machine, a vertical blow mold hinge post, a blow mold comprising a pair of separable halves and a pair of arms each carrying a different mold half and both mounted on said hinge post to swing the mold halves about the axis of the post between fully open and closed positions, said mold having a molding cavity open at the top of the mold when the halves thereof are closed, a glass blank or parison transfer tongs comprising a pair of arms mounted on said post to swing about the axis thereof and a pair of jaws respectively carried by the tongs arms so as to be closed directly above the position of the closed mold halves on predetermined swinging movements of the tongs arms toward each other and to be opened by reverse swinging movements of the tongs arms to overlie the respective mold halves when the latter have been swung to their fully open positions, spring means acting constantly on said tongs arms to tend to swing them about the axis of said hinge post from positions to open to positions to close said jaws, rigid projections on the respective tongs arms, and rigid elements on the blow mold arms respectively located in positions for contact with the corresponding projections on the tongs arms to permit said tongs arms to swing from positions to open the tongs jaws to positions to close said jaws while said blow mold arms are moving only part of the way from positions to fully open the mold halves to positions to fully close them and thereafter to move out of contact with said projections to permit closing of the mold halves.

4. The combination defined by claim 3 wherein the rigid elements on the mold arms contact with the rigid projections on the tongs arms so as to effect full opening of the tongs jaws when the mold halves are fully opened and, in addition, a stop interposed in a fixed position between portions of the tongs arms to be contacted thereby to limit the closing movements of the tongs arms and thus predetermine the closed positions of the tongs jaws.

5. The combination defined by claim 3 and, in addition, operating means to swing the blow mold arms about the axis of said hinge post, said operating means being operable to move the mold halves only part way to their closed positions so as to permit closing of the tongs jaws, thereafter to open the mold halves fully and also open the tongs jaws, and finally to fully close the mold halves and, during the initial part of the closing movements of the mold halves, permit re-closing of the tongs jaws.

6. In a glassware forming machine, a blow mold comprising a pair of openable and closable halves and having a molding cavity open at the top of the mold when the halves thereof are closed, a glass blank or parison transfer tongs comprising a pair of jaws mounted to close in a plane directly above and in axial alignment with the mold when the halves of the latter are closed, operating means for the tongs constructed and arranged to close the tongs jaws when the mold halves are moved only part way from their fully open to their fully closed positions, to permit full closing of the mold halves while the tongs jaws are closed, and to open the tongs jaws fully when the mold halves are opened fully, an oscillatory neck ring for bringing a glass blank or parison to position to be supportingly engaged by the jaws of the transfer tongs when the latter are closed, and a rotary tongs mechanism movable from an out-of-the-way inactive position to a position to grip a projecting upper end of the blank or parison above the transfer tongs so as to take over support of the blank or parison from the transfer tongs and permit opening of the transfer tongs jaws.

7. The combination defined by claim 6 and, in addition, a blowhead combined with the rotating tongs mechanism and movable therewith, whereby blowing air may be introduced into the blank or parison suspended from the rotary tongs.

References Cited in the file of this patent

UNITED STATES PATENTS

| 1,783,191 | La France | Dec. 2, 1930 |
| 1,967,452 | Rule | July 24, 1934 |
| 2,382,052 | Gray | Aug. 14, 1945 |
| 2,645,059 | Rowe | July 14, 1953 |